United States Patent
Haartsen et al.

(10) Patent No.: US 6,563,892 B1
(45) Date of Patent: May 13, 2003

(54) METHOD AND SYSTEM FOR DETECTION OF BINARY INFORMATION IN THE PRESENCE OF SLOWLY VARYING DISTURBANCES

(75) Inventors: Jacobus Haartsen, Borne (NL); Paul Dent, Pittsboro, NC (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/332,955

(22) Filed: Jun. 15, 1999

(51) Int. Cl.$^7$ ................................................ H04B 1/10
(52) U.S. Cl. ........................ 375/350; 375/346; 375/348
(58) Field of Search ................................ 375/350, 348, 375/346, 341, 229, 230, 231, 232, 233, 234; 708/301, 319, 320, 322, 323

(56) References Cited

U.S. PATENT DOCUMENTS

| | | | |
|---|---|---|---|
| 5,142,552 A | * 8/1992 | Tzeng et al. | 375/232 |
| 5,241,702 A | 8/1993 | Dent | 455/278.1 |
| 5,285,480 A | 2/1994 | Chennakeshu et al. | 375/101 |
| 5,659,583 A | * 8/1997 | Lane | 375/346 |
| 6,226,323 B1 | * 5/2001 | Tan et al. | 375/233 |
| 6,301,298 B1 | * 10/2001 | Kuntz et al. | 375/232 |
| 6,314,147 B1 | * 11/2001 | Liang et al. | 375/346 |

OTHER PUBLICATIONS

Carley, L.R., et al., "A Pipelined 16–State Generalized Viterbi Detector", IEEE Transactions o Magnetics, vol. 34, No. 1, Jan. 1998, pp. 181–186, XP002132530.
Moehrmann, K.H., et al., "Ein Wechselstromgekoppeltes Analogwert–Schieberegister", Nachrichtentechnische Fachberichte, De, Vde, Verlag, Berlin, Mar. 1969, pp. 353–356 XP000763929.
Haartsen, J., "Bluetooth—The Universal Radio Interface for Ad Hoc, Wireless Connectivity", Ericsson Review, Telecommunications Technology Journal No. 3, 1998, pp. 110–117.

* cited by examiner

Primary Examiner—Mohammad H. Ghayour
(74) Attorney, Agent, or Firm—Burns, Doane, Swecker & Matthis

(57) ABSTRACT

A radiocommunication system is described in which DC offset and other slowly varying disturbances which that may impact a signal are suppressed. Exemplary embodiments of the present invention combine a difference circuit, e.g., a FIR filter, with a maximum likelihood sequence estimator, e.g., a Viterbi detector, to implement suppression techniques on binary signals.

31 Claims, 11 Drawing Sheets

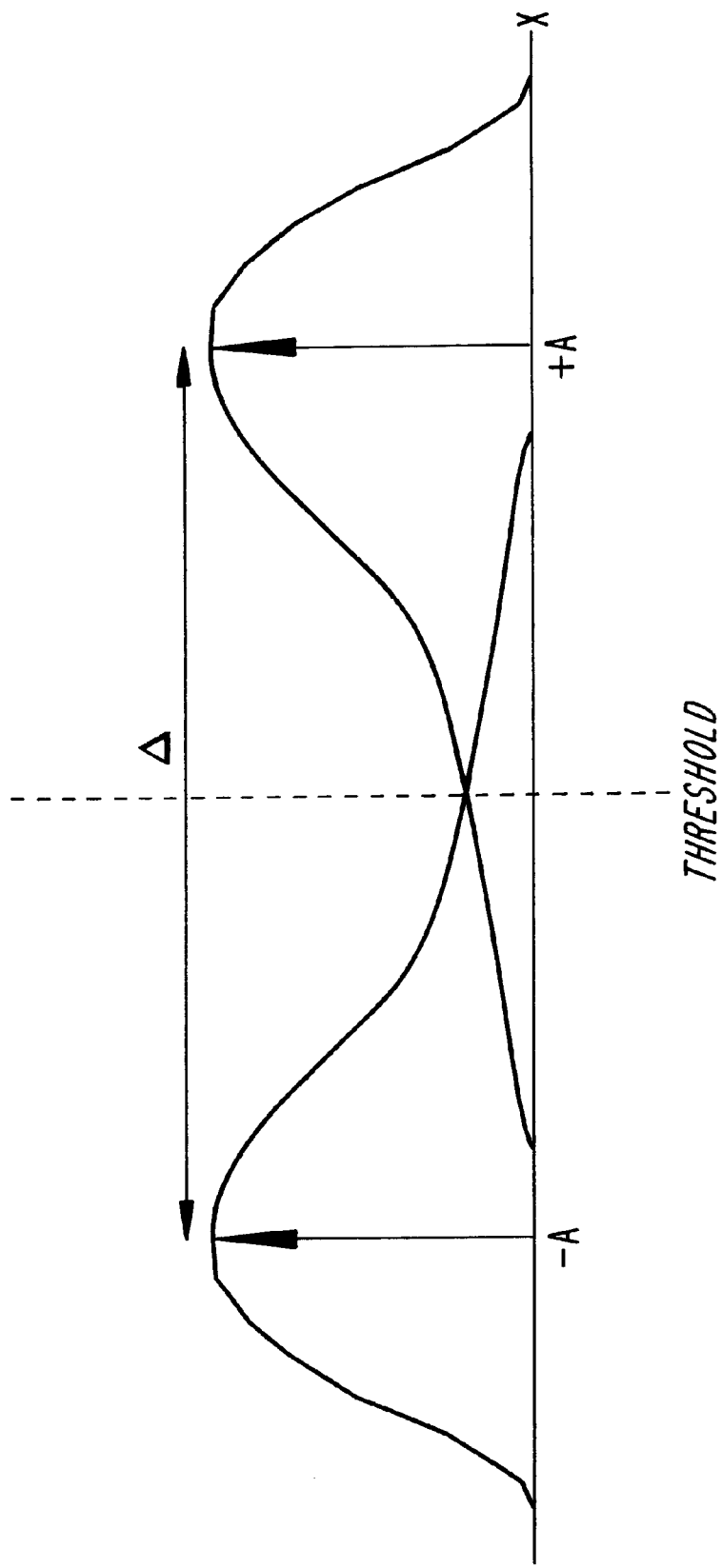

METHOD AND SYSTEM FOR DETECTION OF BINARY INFORMATION IN THE PRESENCE OF SLOWLY VARYING DISTURBANCES

BACKGROUND

The present invention pertains to systems and methods involved in radiocommunication systems and, more particularly, to systems that employ binary signal streams of known amplitude which are disturbed by, for example, DC offsets, drifts, and other slowly changing disturbances superimposed on the desired binary signal. The techniques described herein are particularly well-suited for the detection of binary FM or binary FSK modulated signals in the presence of such disturbing signals, but can also be used in conjunction with other types of modulation.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

FIG. 1 illustrates an example of a conventional cellular radio communication system 100 in which the present invention can be implemented. The radio communication system 100 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b and 120m) within a plurality of cells 110a–n. Communication from a base station to a mobile terminal is referred to as the downlink, whereas communication from a mobile terminal to the base station is referred to as the uplink.

The base stations are connected to a mobile telephone switching office (MSC) 150. Among other tasks, the MSC coordinates the activities of the base stations, such as during the handoff of a mobile terminal from one cell to another. The MSC, in turn, can be connected to a public switched telephone network 160, which services various communication devices 180a, 180b and 180c.

In conventional cellular radiocommunication systems such as that illustrated in FIG. 1, the signal transmitted over the air interface does not travel along a single, straight path. Instead, the radiated energy reflects and travels in many directions so that different portions of the radiated energy arrive at the receiver (i.e., either that of terminals 120 or base stations 170) at different times. As a result, the receiver receives a distorted signal that is very different from the original signal. This distortion problem, which is commonly referred to as multipath fading, can be viewed as a smearing of the transmitted pulses.

In such conventional systems, the effects of the radio channel are measured and taken into account in the receiver when attempting to correctly determine the originally transmitted information. Channel estimates are calculated based upon known information which is periodically transmitted over the radio channel to the receiver. Since radio channels may change rapidly, e.g., due to movement of the terminals 120, the channel estimate can be regularly updated.

Channel estimation can be used in conjunction with an application of the Viterbi algorithm to determine the originally transmitted information as shown in FIG. 1(b). Therein, the received signal is used to produce channel estimates at block 200. The channel estimates are provided to the Viterbi detector 220, wherein they are employed to determine metrics associated with the likelihood of various state transitions. Those skilled in the art will readily understand the operation of Viterbi detector 220 and, therefore, a fuller discussion of this device is not provided here. A filter 240 may also be provided upstream of the Viterbi detector 220 to whiten the noise associated with the earlier processing (not shown) on the received signal, since it has been shown that Viterbi detectors provide optimal results in the presence of white, rather than colored, noise.

Although channel effects are a dominant disturbance in conventional cellular systems, in other types of systems the dominant disturbance to transmitted signals may arise from other sources. For example, a new relatively low cost, low range wireless transmission system (defined by the recently developed "Bluetooth" technology) has been proposed for localized two-way data transmissions. Bluetooth systems are envisioned as a universal radio interface in the 2.45 GHz frequency band that enable portable electronic devices to connect and communicate wirelessly via short-range, ad hoc networks. Readers interested in various details regarding the Bluetooth technology are referred to the article entitled "BLUETOOTH—The universal radio interface for ad hoc, wireless connectivity" authored by Jaap Haartsen and found in the Ericsson Review, Telecommunications Technology Journal No. 3, 1998, the disclosure of which is incorporated here by reference. Of particular interest for this discussion is the fact that channel effects associated with the Bluetooth air interface may not be the dominant disturbance to transmitted signals in such systems, due to the short-range nature of the air interface links. Accordingly, other slowly varying disturbances may be more problematic than channel effects in such systems.

Such disturbances can have several origins. In many instances, the disturbance cannot be filtered out when the desired signal itself has low-frequency components. Examples of such disturbances include DC offset in homodyne receivers, offset in FM discriminators due to inaccuracies in the local oscillator frequency, drift (in otherwise presumably constant signal levels) due to temperature and aging, all of which represent situations where special attention has to be given to obtain error-free recovery of the desired signal.

There are several methods for performing DC offset suppression. The simplest methods use DC blocking capacitors to high-pass filter the signal. However, these filters have long response times which result in long settling times after turning on the receiver. Such long settling times are unacceptable in TDMA receivers where the receiver is switched on and off repetitively. Another technique for performing DC offset suppression is differentiation followed by integration. The differentiation removes all DC components since it has a zero at DC. Integration inverse filters the differentiated signal. The differentiation and integration can conveniently be carried out using adaptive delta modulation (ADM) techniques, e.g., as described in U.S. patent application Ser. No. 07/578,251, entitled "DC Offset Compensation", filed in September of 1990 to Paul W. Dent. However, this technique requires considerable oversampling and can only be used to suppress DC offset. Drifts and other slowly varying, unwanted signals cannot be suppressed. Other suppression techniques are carried out in the digital domain, but require a high dynamic range of the A-to-D converter since no suppression has taken place prior to the digital processing.

Accordingly, it would be desirable to provide a solution to address the problems associated with slowly varying disturbances, such as DC offset, drift, etc.

SUMMARY

These, and other, drawbacks, limitations and problems associated with conventional techniques for compensating for slowly varying disturbances are overcome by the present invention which removes slowly varying disturbances superimposed on streams of binary symbols with known separation. According to one exemplary method, the signal is first sampled at the symbol rate. The symbols are then fed into a discrete, finite-impulse-response (FIR) filter that removes the disturbance. The effects of the filter on the desired binary signal (e.g., intersymbol interference) are undone in a decoder that applies a Viterbi algorithm and acts like an equalizer. The Viterbi algorithm uses the knowledge of the constant amplitude separation of the binary signals, and forms estimates of the filter response for different possible desired input sequences.

The complexity of the exemplary systems according to the present invention depends on the length of the FIR filter. The longer the FIR filter, the more states are required in the Viterbi algorithm. The performance of the system depends on the coefficients of the FIR filter. Exemplary embodiments of the present invention describe how to tailor the trade-off that can be made between the noise performance and the suppression performance of the FIR filter.

BRIEF DESCRIPTION OF THE DRAWINGS

The foregoing objects, features and advantages of the present invention, as well as other features, will be more readily understood upon reading the following detailed description in conjunction with the drawings in which:

FIG. 2 shows a signal representation of binary signals in an arbitrary noisy environment;

FIG. 3(a) illustrates step responses in an information signal caused by on-off events;

FIG. 3(b) illustrates an additional step due to an adjacent interferer in a homodyne detector;

FIG. 3(c) depicts the effects caused by a continuous wave interferer on an information signal;

FIG. 3(d) illustrates the effects caused by a drifting local oscillator on an information signal;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as useful in systems employing the Bluetooth technology, e.g., having operating characteristics such as frequency hopped CDMA, low transmit power, etc. However, those skilled in the art will appreciate that the concepts disclosed herein find use in other protocols and systems, including, but not limited to, frequency division multiple access (FDMA), time division multiple access (TDMA), code division multiple access (CDMA), or some hybrid of any of the above protocols.

In particular, exemplary embodiments of the present invention provide techniques for handling disturbances associated with binary signals. A general binary signal representation is shown in FIG. 2. Therein, there are two possible symbols, +A and −A. Due to noise, there is a signal probability distribution around the noise-free values +A and −A. A bit decision can be made by providing a threshold between the two possible values, and then making a bit decision according to the location of the detected sample with respect to the threshold. The optimal threshold location is at the intersection of the two probability distribution functions as shown in FIG. 2. Often, there is mirror symmetry in the functions between +A and −A, and then the threshold can be placed halfway between the two signal values.

If a disturbance is superimposed on the binary signal, the signal values +A and −A are translated in the X-direction according to the disturbance. FIGS. 3(a)–3(d) show some examples of signals disturbed by DC offset or other slowly varying signals. Each of these figures depicts the original signal as the top function, followed by one or more disturbing signals, with the resultant combination of the original signal plus the disturbing signal illustrated at the bottom of each figure. For example, in FIG. 3(a), an original signal 300 is disturbed by DC offsets 310 resulting in the composite signal 320. These DC offsets are generated as soon as the electronic circuitry of the receiver is switched on. Thus, DC blocking is not possible for this condition, since a fast receiver response is needed so that the receiver can detect, e.g., the beginning of a signal burst associated with that receiver's channel.

Figure 1A:
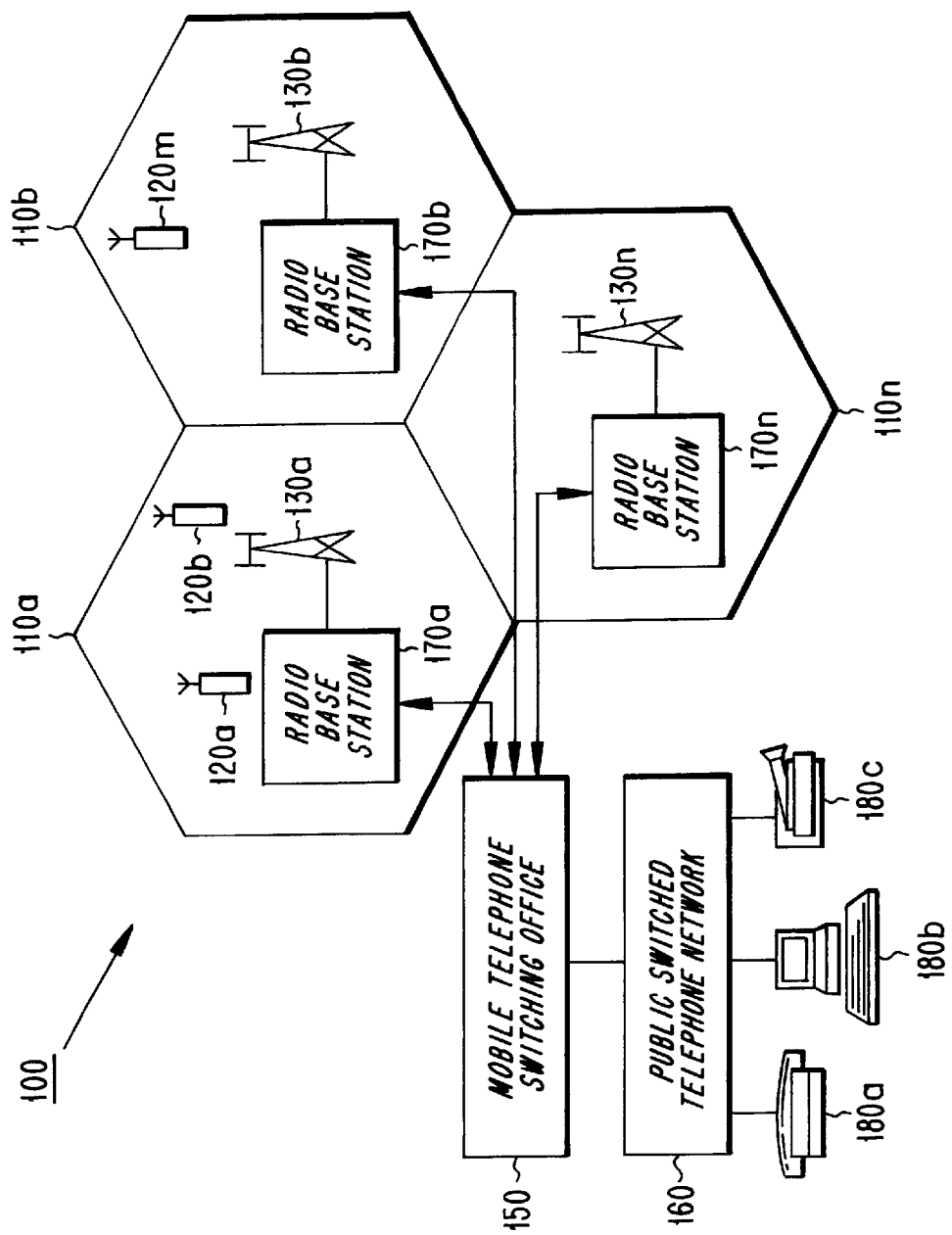
FIG. 1(a) shows a conventional radio communication system including plural base stations and a mobile telephone switching office.
Figure 1B:
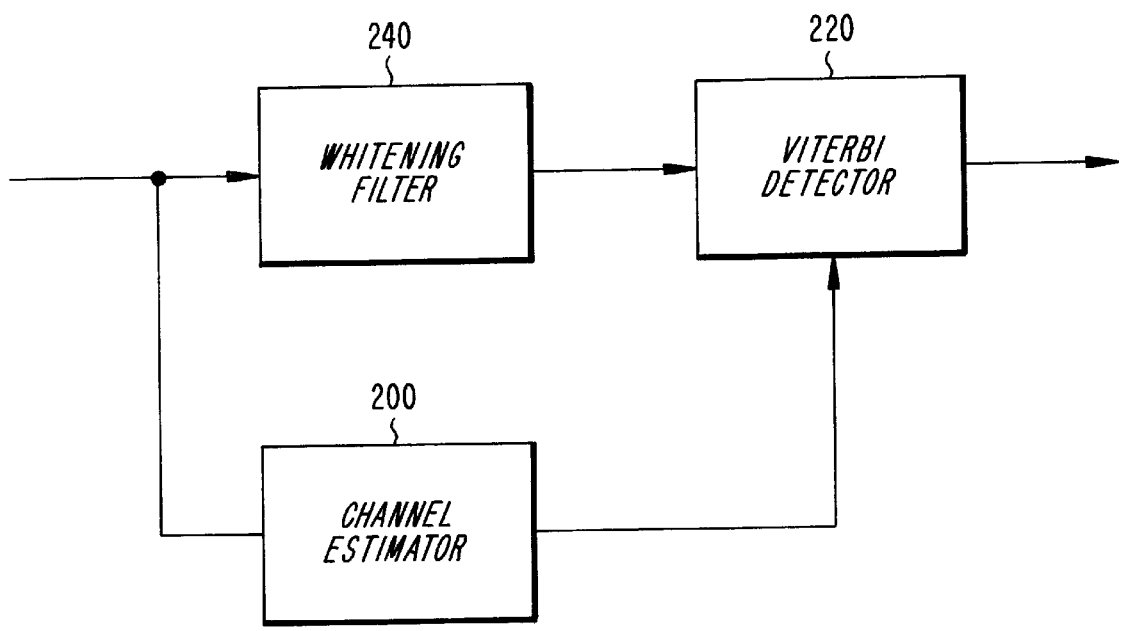
FIG. 1(b) depicts a portion of a conventional receiver including a channel estimator, Viterbi detector and filter.
Figure 3A:
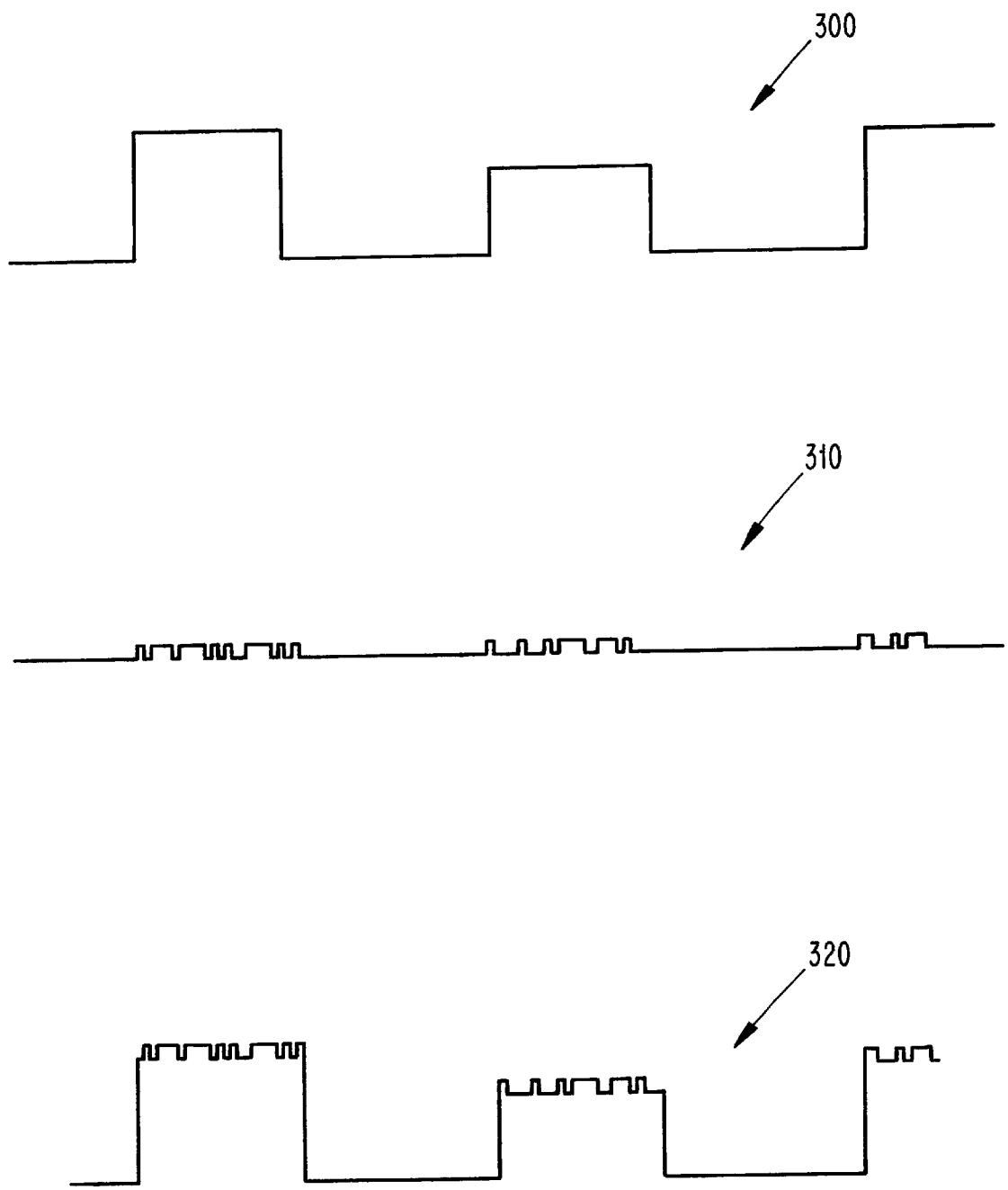
FIGS. 3(a)–(d) show various types of disturbed information signals which can be found in communications receivers, more specifically.
Figure 3B:
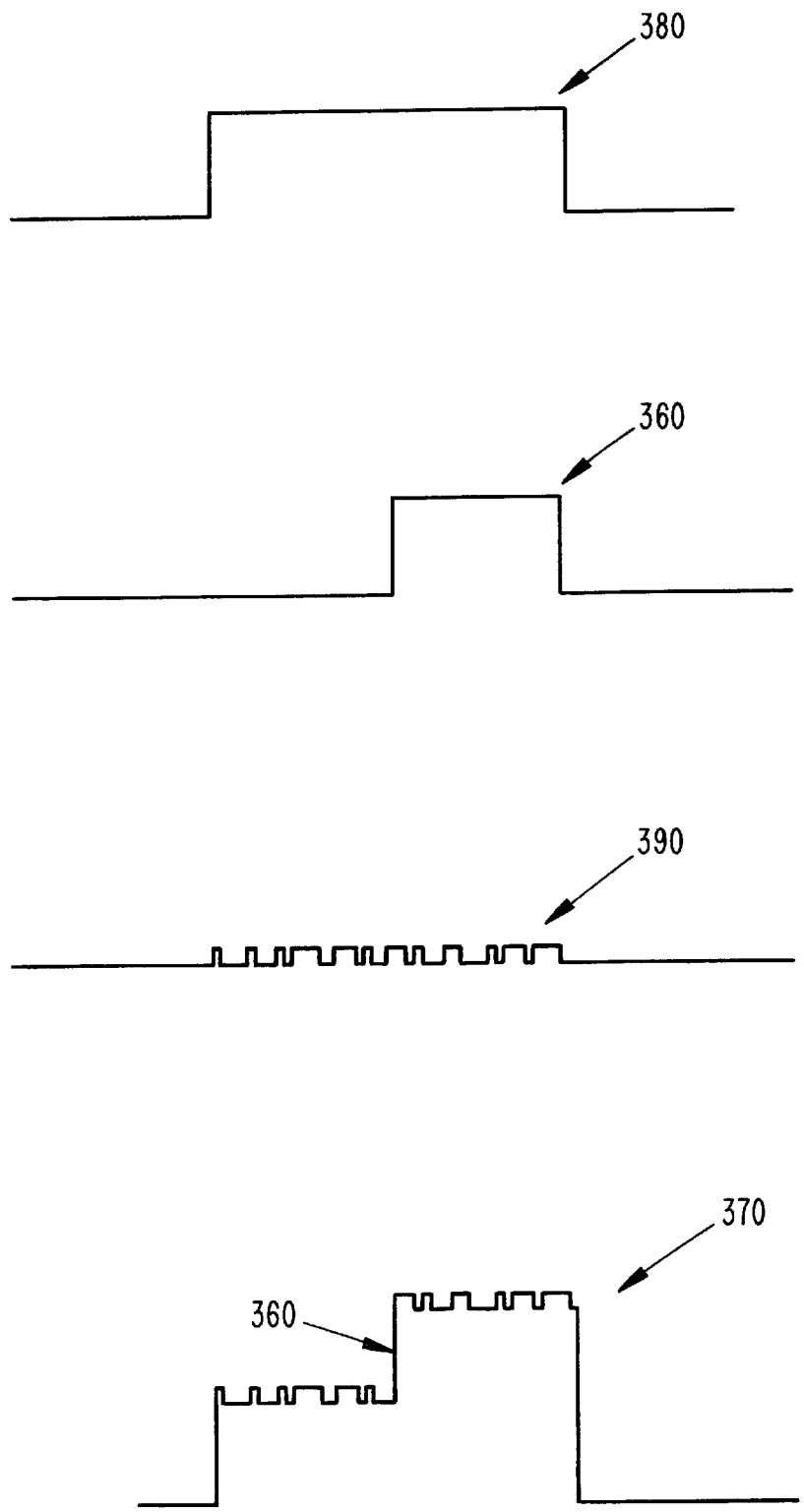
Figure 3C:
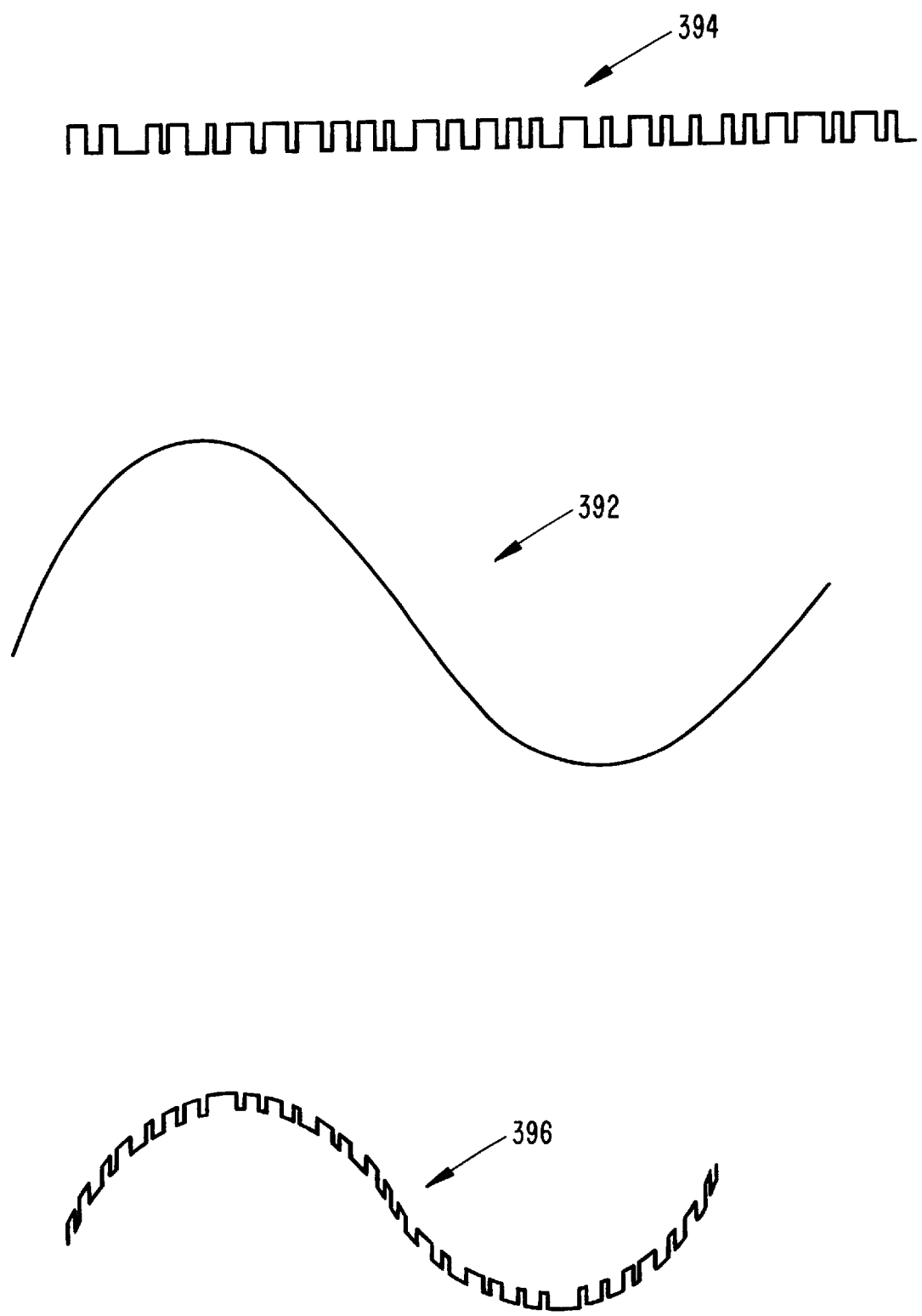
Figure 3D:
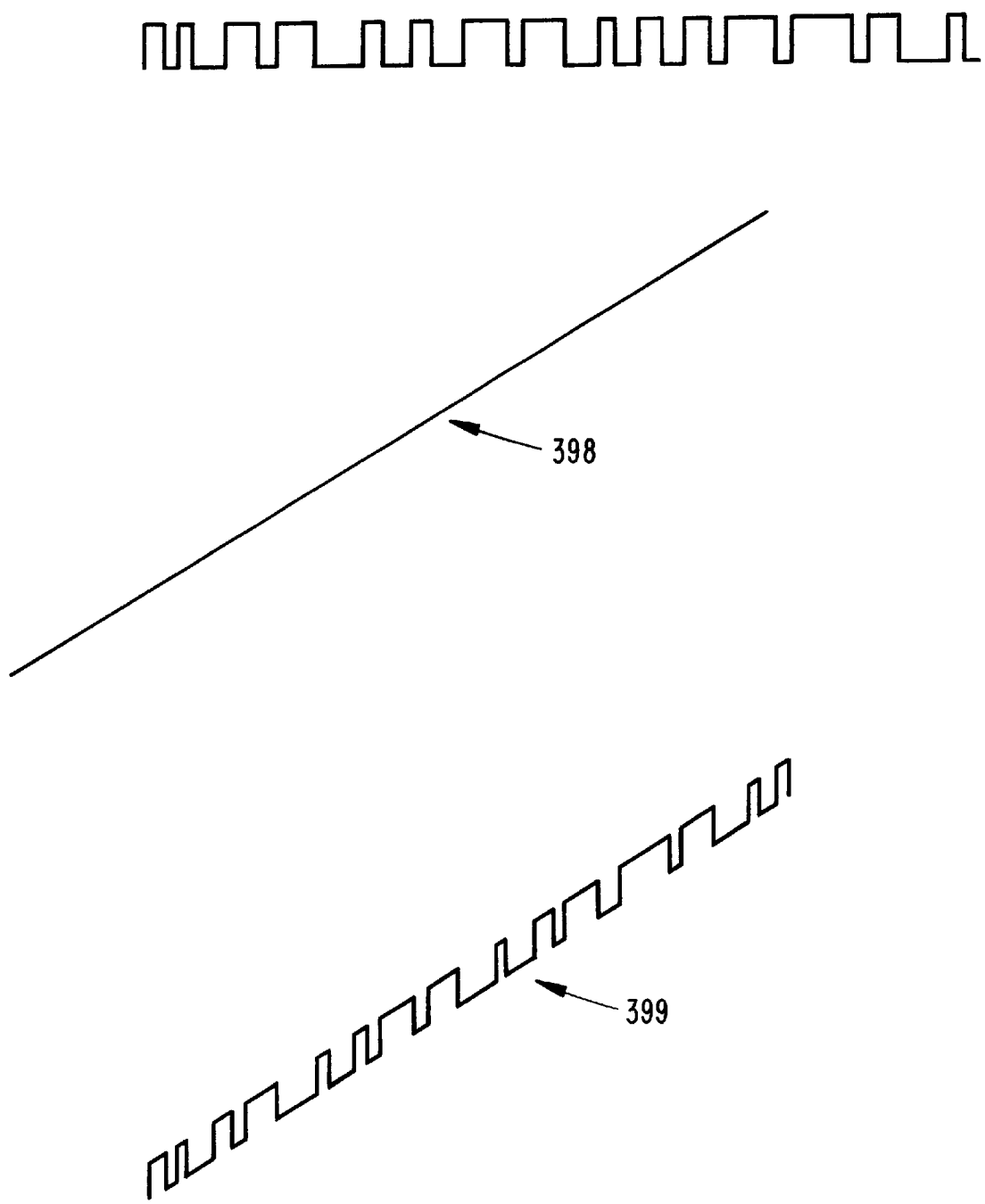

In FIG. 3(b), an additional DC step response 360 in the middle of the burst is seen in the composite signal 370, which additional DC step response can be experienced, for example, in homodyne receivers due to intermodulation in the receive chain. As in FIG. 3(a), the original signal 380 in FIG. 3(b) is also disturbed by DC offset 390. FIG. 3(c) shows a continuous wave interference signal 392 superimposed on the desired signal 394 to result in a composite signal 396. Additionally, FIG. 3(d) shows a drift 398 in the detected signal 399, which drift can result from temperature variations, aging or imbalance problems.

Despite these types of variations and disturbances experienced by the signal, the threshold for the bit value determination has conventionally remained fixed (assuming no a priori knowledge about the interference present, which would allow an adaptation of the threshold). As a result, bit errors are introduced since the fixed threshold does not remain located at the optimal position midway between the signal values. However, since the amplitude of the binary signal is fixed (e.g., as in binary FM signals, wherein the modulation index represents the amplitude of the final detection signal at the output of the FM detector and is fixed), the separation Δ between the signal symbols remains fixed regardless of the disturbance superimposed on the signal.

Therefore, a better detection technique for binary signals disturbed by slowly varying signals is to abandon the threshold technique, and instead use the difference Δ between the two possible symbols. To be able to use this technique, the signal separation between the two symbols must be fixed. Therefore, this difference technique can only be used in systems where this separation is constant and is not affected by propagation effects. Such difference techniques include, for example, binary phase or frequency modulation schemes (e.g. continuous phase frequency shift keying, CPFSK) which are widely used in wireless communication because of the property that the signal variation is hardly affected by propagation effects.

A known technique that uses the difference between two adjacent symbols is differential keying. In differential keying, a one is represented by a change between two adjacent symbols, whereas a zero is represented by no change between adjacent symbols (or the other way around). Differential keying is primarily found in phase modulation schemes (DPSK) but can be used in other modulation schemes as well. For example, frequency modulation could also be implemented in this manner, e.g., a DFSK scheme (Differential Frequency Shift Keying) wherein for a binary one, two adjacent symbols use $f_o+\Delta f$ and $f_o-\Delta f$, whereas for a binary zero, the symbols use both $f_o+\Delta f$ or both $f_o-\Delta f$. The original signal d(k) at time instant k is retrieved in the detector by sampling the input signal at the symbol rate and comparing two adjacent samples. This can be achieved by subtracting the previous symbol x(k−1) from the current symbol x(k):

$$d(k)=x(k)-x(k-1) \quad (1)$$

It will be appreciated by those skilled in the art that this type of differential modulation scheme removes all DC offset. In addition, some low-frequency signals can be removed as long as the difference in the disturbance level between adjacent samples is less than Δ/2. DFSK modulation is, however, not used much in practice since its signal-to-noise (SNR) performance is degraded compared to FSK. This degradation occurs because, for the determination of a single bit, the noise of two samples is taken into account in the differential process. Therefore, the performance in white Gaussian noise of DFSK modulation is more than 3 dB worse than that of FSK modulation.

According to exemplary embodiments of the present invention, a performance improvement can be obtained by taking into account the difference signals from more than two adjacent samples. That is, whereas conventional DFSK modulation only uses the information from two samples which are adjacent to determine a bit's value, exemplary embodimerits of the present invention use the information from more than two adjacent samples to make a bit decision. To perform this technique, the decision of a bit is delayed and the difference information of future bits is used to make a more accurate decision. An example will serve to better illustrate an exemplary method according to the present invention.

Figure 4:
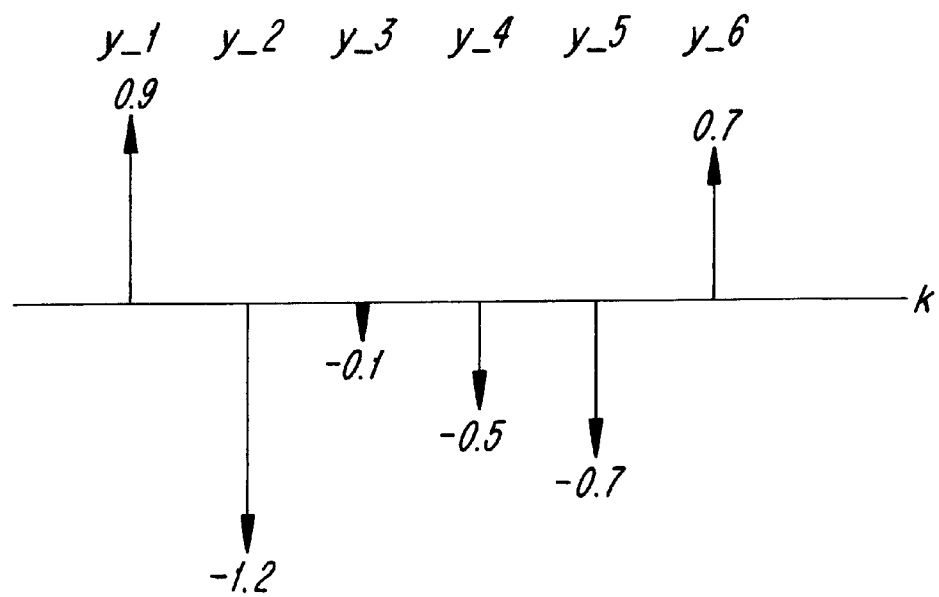
FIG. 4 is an example of sampled, binary sequence in presence of noise.

Consider the binary symbols with noise as shown in FIG. 4. For those readers more familiar with the binary alphabet being {+1, −1}, a 0 corresponds to a −1 value whereas a 1 corresponds to a +1 value. The signal separation Δ is 2 in this example and the desired sequence is x={1 0 0 0 0 1}. However, due to noise, the sampled values y_1 to y_6 are, in this example, {0.9, −1.2, −0.1, −0.5, −0.7, 0.7} as shown in FIG. 4.

If the detector only takes the difference between adjacent samples, the difference signal is then {−2.1, 1.1, −0.4, −0.2, 1.4} for this example. Assuming that the first bit x_1 was a 1, a conventional DFSK detector would give an output sequence of {1 0 1 1 1 1}, using the framework that a 1 is decided when the difference is bigger than 1.0, a 0 is decided when the difference is smaller than −1.0, and no change from the previous bit is decided when the difference is between −1.0 and 1.0.

However, Applicants have recognized that a more intelligent scheme would recognize other characteristics within the sampled values to more correctly detect the received bits. For example, noting the magnitude of the last difference in the difference sequence, i.e., 1.4, makes it highly probable that a transition from 0 to 1 took place. Therefore, x_6 must be 1 and x_5 must be 0. Taking into account the relatively small differences between the sampled values associated with x_5, x_4, x_3, and x_2, it can be recognized that all these bits should have the same value as bit x_5, i.e., 0. Between x_2 and x_1, the difference shows that the transition from 1 to 0 is highly probable. Since x_1 was assumed to be 1, x_2 must then be zero which matches with the derivation of the value of x_2 described above based on its similarity to bits x_5, x_4 and x_3. Therefore, the decoded sequence according to this empirical detection technique is {1 0 0 0 0 1}, which is identical with the original signal.

To implement the evaluation of such characteristics, one exemplary embodiment employs algorithms which incorporate information associated with future bits or symbols, e.g., the well known Viterbi algorithm (VA). In the VA, all possible transitions are investigated, and a record is kept from the error between the hypothesized transitions and the actual transitions experienced. One realization of possible transitions form a path through the trellis tree of the Viterbi decoder. The error signals are accumulated and represent the metric of the path. At each node, the path with the lowest metric survives, the other is eliminated. When sufficient future symbols are investigated, a bit decision of the symbol at the start of the paths can be performed. The number of future symbols tested is called the decision depth. Those skilled in the art will understand the operation of the Viterbi algorithm per se and, therefore, additional details regarding this algorithm are not described herein.

Figure 5:
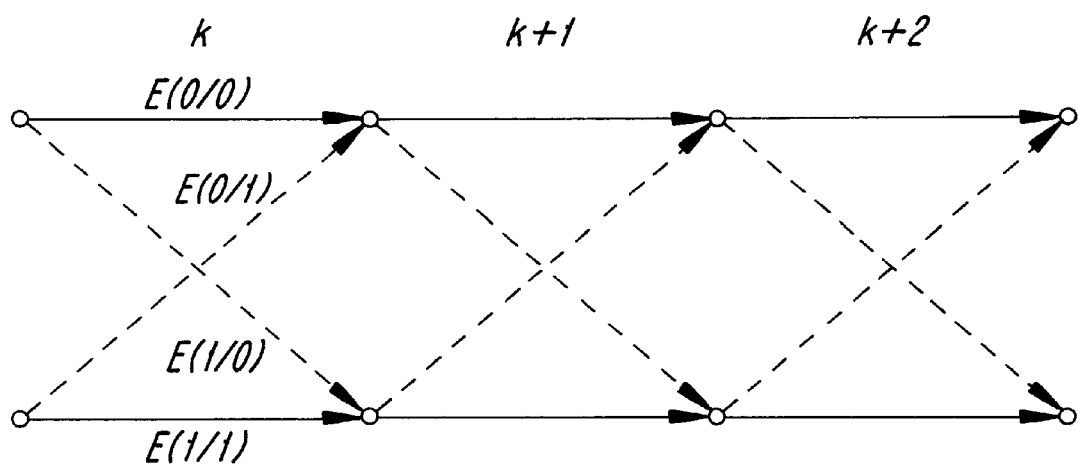
FIG. 5 is a trellis diagram for a two-state Viterbi decoder employing a 2-tap FIR filter.

Exemplary embodiments of the present invention feed an input signal received by a communications device, e.g., in a mobile phone or base station, through a prefilter which removes the DC offset and low-frequency components. This prefilter applies the difference equation given in equation (1), above. The output of the prefilter is then passed to a Viterbi decoder (see FIG. 6). From the difference signals, the Viterbi decoder retrieves the original signals but with the disturbances removed. For the prefilter of equation (1), wherein only the difference between two adjacent symbols is taken into account, the corresponding Viterbi trellis is shown in FIG. 5. Each state in the Viterbi trellis of FIG. 5 is represented by a circle into which the state transition arrows feed.

In the trellis, the instantaneous error associated with state transitions is represented by E(c|p) where c is the current, hypothesized bit and p is the previous, hypothesized bit. For a binary signal with distance Δ, the error signals at instant k are:

$$E_k(0/0) = d(k)^2$$

$$E_k(1/0) = (d(k) - \Delta)^2$$

$$E_k(0/1) = (d(k) + \Delta)^2$$

$$E_k(1/1) = d(k)^2$$

where $d(k) = x(k) - x(k-1)$ is the difference between the current sample and the previous sample. This instantaneous error is added to the path metric. The hypothesized bits in the path form the path history. When sufficient bits are incorporated in the path history, i.e., when the decision depth is reached), a decision on the first bit is made by comparing the cumulative metrics of all paths and selecting the path with the lowest metric. The oldest bit in the path history of this path is selected as the decision bit.

Using a Viterbi decoder 62 after the difference circuit 60 instead of just a threshold detection (i.e., as in conventional DFSK detection) improves the SNR performance by about 1 dB. In addition, the performance in the presence of disturbance signals is much better than in case of conventional DFSK, since the step in the disturbance between adjacent samples can be much bigger than Δ/2. However, the SNR performance is not yet as good as the conventional FSK detector, as will be apparent to those skilled in the art from the following discussion.

The difference circuit can be regarded as a discrete high-pass filter with a frequency response $G(\omega)$:

$$G(\omega) = \sin(\omega) \cdot -\pi < \omega < \pi$$

where ω is the normalized frequency. This is not an ideal high-pass filter, since an ideal high pass filter would have a flat spectrum with only a zero at ω=0. Since $G(\omega)$ is not an ideal filter, the noise out of this filter is not white but colored which means that there is a correlation between the noise in adjacent difference samples. This degrades the Viterbi detection, which is optimized for white noise.

The high-pass filter characteristics can be improved by increasing the order of the difference equation. Consider that the difference circuit can be regarded as a FIR filter with coefficients $a(m)$, such that:

$$d(k) = a(0) \cdot x(k) + a(1) \cdot x(k-1) + a(2) \cdot x(k-2) \ldots$$

The first-order filter discussed above for implementation of equation (1) has only two taps with values $a(0)=1$ and $a(1)=-1$, i.e., it provides a difference only between adjacent samples. The rest of the coefficients of the FIR filter are zero. For a higher order filter, more taps are used, i.e., information regarding other samples is employed. To maintain the DC offset suppression qualities of this filter, the sum of the FIR coefficients should be zero:

$$\sum_{m=0}^{N-1} a(m) = 0 \quad (2)$$

In order to correct for the intersymbol interference (ISI) introduced in higher order FIR filters, the number of states employed by the Viterbi decoder 62 has to increase. For an N-tap FIR filter, the number of required states in the Viterbi decoder is $2^{(N-1)}$. The instantaneous error in the Viterbi decoder can be derived from the filter response as follows:

$$E_k(c|p_1 p_2 p_3 p_4 p_5 \ldots pN) = (d(k) - [a(0)c + a(l)p_1 + a(2)p_2 + \ldots + a(N)p_N] - \Delta/2)^2 \quad (3)$$

where c is the current hypothesized bit, $p_1 p_2 \ldots p_N$ is the path history ($p_N$ is the oldest bit) and d(k) is the current output of the FIR filter. $E_k$ can be determined for all $2^N$ possible paths. Then at each Viterbi state, the worst path (i.e., the path with highest path metric) is rejected and eliminated from the scheme.

To suppress DC offsets and other low frequency disturbances according to exemplary embodiments of the present invention, the FIR filter coefficients of filter 60 should be chosen to provide a high-pass filter characteristic having a predetermined order, which characteristic will represent a trade-off between the SNR performance (under disturbance-free conditions), and the disturbance suppression capabilities. The better the SNR performance, the worse the suppression of low-frequency disturbances. If only DC offset suppression is required in a particular implementation of the present invention, as compared with other types of slowly varying disturbances, then apart from the requirement on the sum of the coefficients as given in equation (2), an additional requirement is to have a filter impulse response whose autocorrelation approaches a Dirac pulse as closely as possible.

Figure 6:
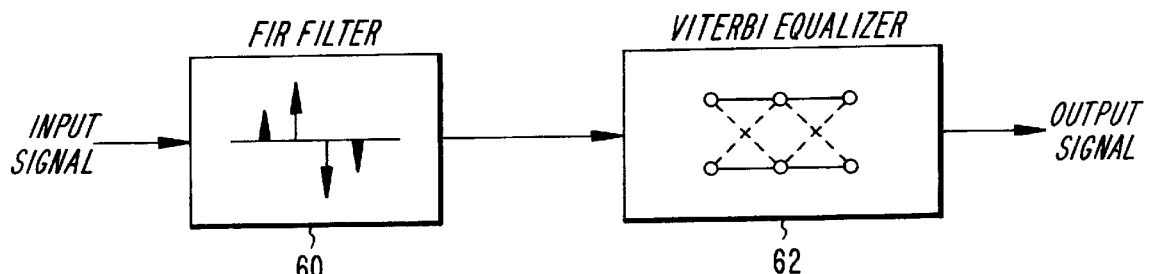
FIG. 6 is an exemplary embodiment of a receiver according to the present invention.

The combination of a FIR filter 60 and a Viterbi detector 62 shown in FIG. 6 is an example of what more generally can be considered as a prefilter to remove unwanted signal components followed by an equalizer to retrieve the desired signal. Thus, other types of filters (e.g., infinite impulse filters) and other types of equalizers (e.g., linear, non-linear, decision feedback, etc.) can also be used in conjunction with the present invention. However, introduction of the FIR filter 60, having filter coefficients which are set to suppress inband interference (e.g., as opposed to adjacent channel interference), colors the noise included in the output from the filter and also introduces intersymbol interference in the desired signal. Thus, the coefficients of the equalizer (or the metrics used in the Viterbi detector 62) should be determined taking into account the filter coefficients employed in filter 60 to optimize the detection of symbols in the desired signal.

Figure 7:
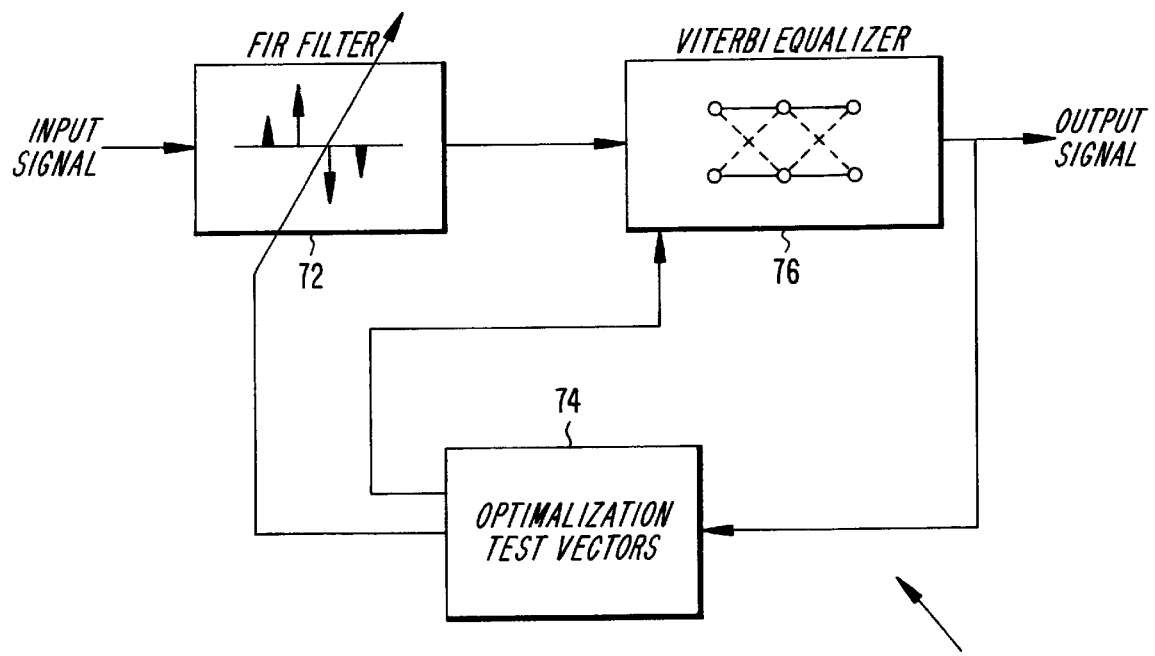
FIG. 7 depicts an exemplary embodiment of the present invention in which an adaptive arrangement is provided to suppress disturbances.

Since the FIR filter 60 of FIG. 6 has fixed coefficients, the Viterbi equalizer parameters are fixed as well. The foregoing exemplary embodiments have focused on suppression of DC offsets and low-frequency disturbances. However, the FIR filter 60 can also be configured to suppress other kind of disturbances, e.g., using equation (3), to recalculate the metrics used in the VA and provide adaptive suppression as illustrated in FIG. 7. In this example, the detector 70 is periodically provided with a test sequence, e.g., a sequence of known symbols. The filter 72 is adaptive and the coefficients are adjusted by an optimizing function 74 such that the test sequence is optimally detected, i.e., that the disturbances are rejected as much as possible. Those skilled in the art will appreciate that this can be accomplished by identifying the parameters of the disturbances and minimizing them using, for example, a least mean square error approach. From the FIR filter coefficients calculated by optimizing function 74, the metric used in the Viterbi equalizer 76 can be derived using equation (3) and an optimal detection chain results.

Figure 8:
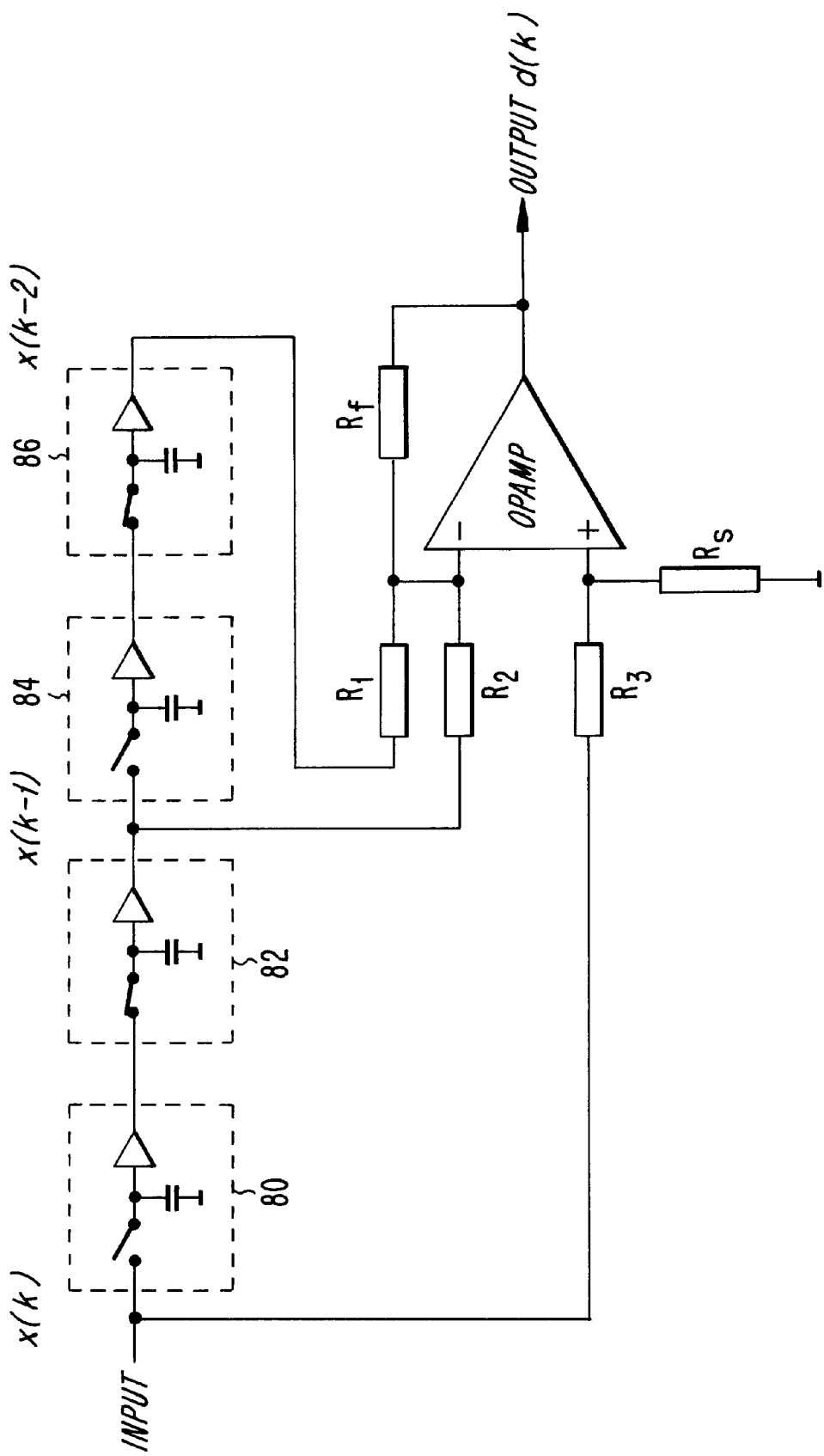
FIG. 8 is an example of a discrete FIR filter in the analog domain.
Figure 9:
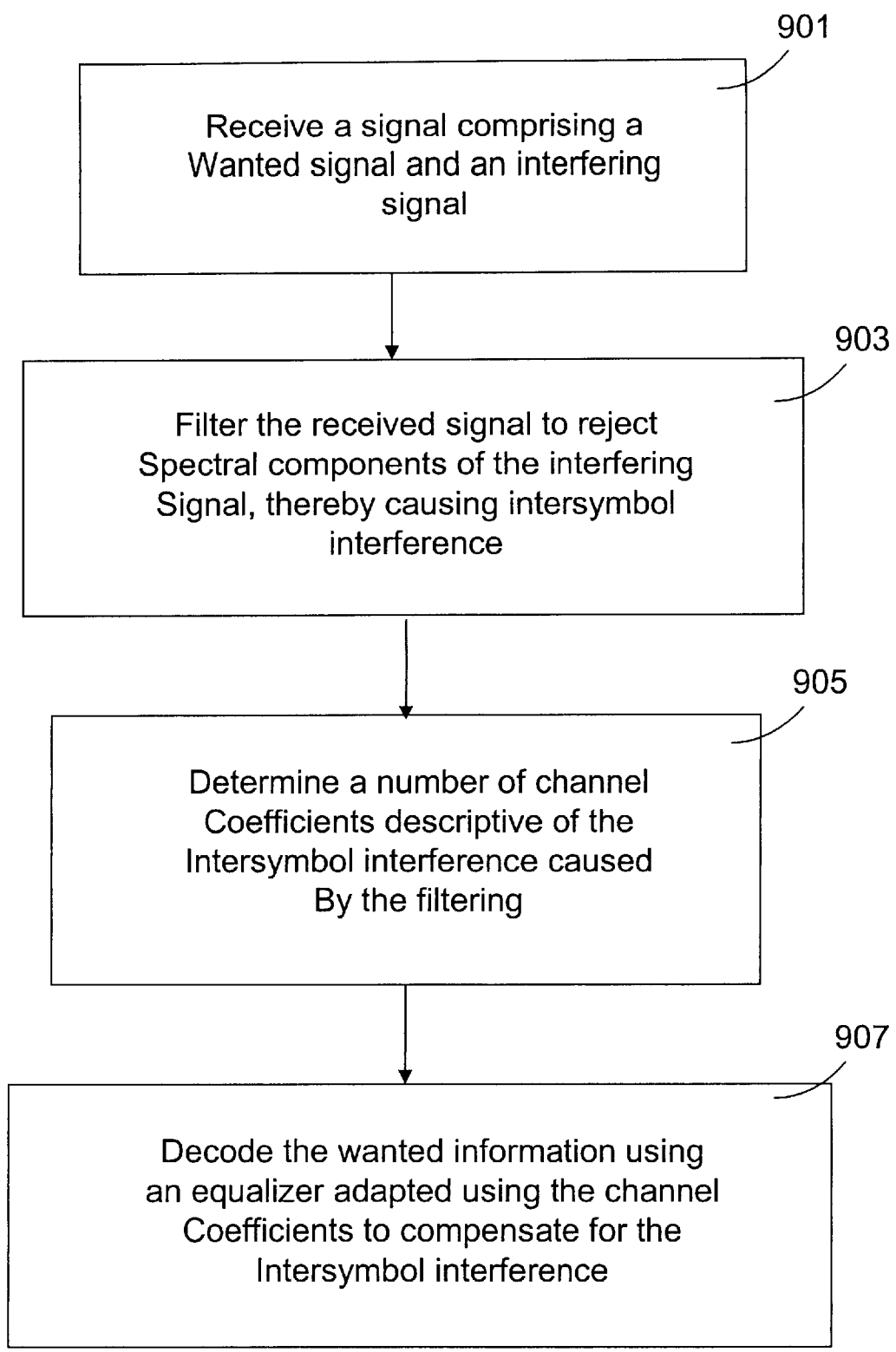
FIG. 9 is a flow diagram of a method of decoding wanted information symbols from a wanted signal according to a exemplary edmbodiment of a the invention.

To reduce the dynamic range of the A-to-D converters in systems with large offsets at the input, the FIR filtering performed by filters 60 or 72 can be performed in the analog domain. In this way, the disturbance is removed before A-to-D conversion. An example of a circuit that performs differencing in the analog domain, and which can be used to implement either FIR filter 60 or 72, is shown in FIG. 8. The sampled data provided at the input is delayed in a switched analog delay line constructed with buffered sample-and-hold circuits 80, 82, 84 and 86. The buffer outputs feed to an operational amplifier (OPAMP) 88 which is configured to operate like an adder and subtracter. The filter coefficients can be implemented by the proper values of the resistors R1, R2, R3, $R_f$ and $R_s$ in a manner which will be apparent to those skilled in the art. If the filter is adaptive, one or more of these resistors can be made to have variable values. The signals leading to the inverting input of OPAMP 88 are multiplied by negative coefficients, while those signals leading to the non-inverting input of OPAMP 88 are multiplied by positive coefficients. The OPAMP output is the filtered signal and has a much smaller dynamic range than the original signal. This output signal is now sampled at the symbol rate, converted to digital format and fed into the Viterbi equalizer 62 or 76.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for suppressing inband interference in binary signals comprising the steps of:
   receiving a signal;
   processing said signal using a filter to suppress said inband interference; and
   determining values associated with said signal by processing an output of said filter using an equalizer, wherein said equalizer is configured to compensate for the distortion introduced by said filter.

2. The method of claim 1 wherein the filter is a FIR filter.

3. The method of claim 2 wherein the FIR filter is a time-discrete analog filter.

4. The method of claim 2 wherein coefficients of the FIR filter are programmable to provide adaptive interference suppression.

5. The method of claim 2, wherein a sum of coefficients of said FIR filter equals zero.

6. The method of claim 5, wherein said FIR filter has a filter impulse response having an autocorrelation value approaching a Dirac pulse.

7. The method of claim 1, wherein an output of said filter contains colored noise.

8. The method of claim 1, wherein said step of determining values further comprises:
   determining said values using a maximum likelihood sequence estimator employing the Viterbi algorithm.

9. The method of claim 1, wherein said inband interference includes DC offset.

10. A receiver for processing a received signal comprising:
    a filter having coefficients which are set to suppress inband interference to generate a distorted output; and
    an equalizer for receiving said distorted output and determining values associated with said received signal samples, wherein said equalizer is configured to compensate for the distortion introduced by said filter.

11. The receiver of claim 10 wherein the filter is a FIR filter.

12. The receiver of claim 11 wherein the FIR filter is a time-discrete analog filter.

13. The receiver of claim 11 wherein coefficients of the FIR filter are programmable to provide adaptive interference suppression.

14. The receiver of claim 10, wherein said equalizer is a maximum likelihood sequence estimator.

15. The receiver of claim 11, wherein a sum of coefficients of said FIR filter equals zero.

16. The receiver of claim 15, wherein said FIR filter has a filter impulse response having an autocorrelation value approaching a Dirac pulse.

17. The receiver of claim 11, wherein an output of said FIR filter contains colored noise.

18. A receiver which suppresses DC offset in binary signals comprising:
    means for receiving a signal;
    means for processing said signal using a difference circuit to generate differences between samples in said signal; and
    means for determining values associated with said signal using said differences wherein said DC offset is suppressed.

19. The receiver of claim 18 wherein means for processing includes a FIR filter.

20. The receiver of claim 19 wherein the FIR filter is a time-discrete analog filter.

21. The receiver of claim 19 wherein coefficients of the FIR filter are programmable to provide adaptive interference suppression.

22. The receiver of claim 18, wherein means for determining values is a maximum likelihood sequence estimator employing the Viterbi algorithm.

23. The receiver of claim 19, wherein a sum of coefficients of said FIR filter equals zero.

24. The receiver of claim 23, wherein said FIR filter has a filter impulse response having an autocorrelation value approaching a Dirac pulse.

25. The receiver of claim 19, wherein an output of said FIR filter contains colored noise.

26. A method for decoding wanted information symbols from a wanted signal while suppressing a systematic unwanted interfering signal having a frequency spectrum lying within the frequency spectrum of the wanted signal comprising the steps of:
    receiving a signal including said wanted signal plus said interfering signal and noise;
    filtering the received signal using a filter having first coefficients set to reject spectral components of said interfering signal, thereby also rejecting wanted spectral components of the wanted signal and causing intersymbol interference;
    determining a number of channel coefficients descriptive of said intersymbol interference caused by said interference-suppression filter; and
    decoding said wanted information using an equalizer adapted using said channel coefficients to compensate for said intersymbol interference.

27. The method of claim 26 in which said filter is a digital filter.

28. The method of claim 26 in which said filter is a Finite Impulse Response filter employing a number of FIR coefficients as said first coefficients.

29. The method of claim 28 in which said channel coefficients are substantially the same as said FIR coefcients.

30. The method of claim 26 in which said step of determining said channel coefficients further comprises the step of:
    correlating the filtered signal with a sequence of known symbols contained in the wanted signal.

31. The method of claim 26 in which said equalizer is a Viterbi Maximum Likelihood Sequence Estimator.

* * * * *